US007716091B2

(12) United States Patent
Ross

(10) Patent No.: US 7,716,091 B2
(45) Date of Patent: May 11, 2010

(54) LOCAL RETURNS OF REMOTELY PURCHASED MERCHANDISE WITH RETURN CODE VALIDATION

(75) Inventor: Frederick L. Ross, Austin, TX (US)

(73) Assignee: Newgistics, Inc., Austin, TX (US)

( * ) Notice: Subject to any disclaimer, the term of this patent is extended or adjusted under 35 U.S.C. 154(b) by 2017 days.

(21) Appl. No.: 09/865,470

(22) Filed: May 24, 2001

(65) Prior Publication Data

US 2002/0178076 A1    Nov. 28, 2002

(51) Int. Cl.
*G06Q 10/00* (2006.01)
(52) U.S. Cl. .................. 705/28; 235/383; 235/385; 705/22
(58) Field of Classification Search .......... 705/26, 705/22, 28, 29, 27; 235/375, 385
See application file for complete search history.

(56) References Cited

U.S. PATENT DOCUMENTS

| 5,515,447 | A | 5/1996 | Zheng et al. ............... 382/100 |
| 5,715,314 | A | 2/1998 | Payne et al. ................ 380/24 |
| 5,715,399 | A | 2/1998 | Bezos ........................ 395/227 |
| 5,724,424 | A | 3/1998 | Gifford ....................... 380/24 |
| 5,727,163 | A | 3/1998 | Bezos ........................ 395/227 |
| 5,812,668 | A | 9/1998 | Weber ........................ 380/24 |
| 5,815,657 | A | 9/1998 | Williams et al. ............ 395/186 |
| 5,828,840 | A | 10/1998 | Cowan et al. .......... 395/200.33 |
| 5,848,399 | A | 12/1998 | Burke ......................... 705/27 |
| 5,850,446 | A | 12/1998 | Berger et al. ................ 380/24 |
| 5,860,068 | A | 1/1999 | Cook .......................... 705/26 |
| 5,878,139 | A | 3/1999 | Rosen ........................ 380/24 |
| 5,889,863 | A | 3/1999 | Weber ........................ 380/25 |
| 5,899,980 | A | 5/1999 | Wilf et al. ................... 705/26 |
| 5,937,394 | A | 8/1999 | Wong et al. ................. 705/26 |
| 5,943,424 | A | 8/1999 | Berger et al. ................ 380/25 |
| 5,960,411 | A | 9/1999 | Hartman et al. ............. 705/26 |
| 5,963,916 | A | 10/1999 | Kaplan ....................... 705/26 |
| 5,963,924 | A | 10/1999 | Williams et al. ............ 705/40 |
| 5,963,949 | A | 10/1999 | Gupta et al. ............... 707/100 |
| 5,970,469 | A | 10/1999 | Scroggie et al. ............ 705/14 |
| 5,978,774 | A | 11/1999 | Rogers et al. ............... 705/24 |
| 5,983,208 | A | 11/1999 | Haller et al. ................ 705/40 |
| 5,984,508 | A | 11/1999 | Hurley ................... 364/479.07 |
| 5,987,132 | A | 11/1999 | Rowney ...................... 380/24 |
| 5,987,140 | A | 11/1999 | Rowney et al. ............. 380/49 |
| 5,999,924 | A | 12/1999 | Bair et al. .................... 707/4 |

(Continued)

OTHER PUBLICATIONS

Heller, Laura "High cost of returns prompts industry cooperation", Discount Store News, Oct. 5, 1998, 37, 19, p. 4.*

(Continued)

*Primary Examiner*—F. Zeender
*Assistant Examiner*—M. Thein
(74) *Attorney, Agent, or Firm*—Baker Botts L.L.P.

(57) ABSTRACT

A method of using a public communications network, such as the Internet, to manage returns of items purchased by a consumer from a remote direct merchandiser. The customer is permitted to return an item to a local returns site or by having a local shipper pick up the item. Either of these local entities is in communications with a returns manager, who provides return information, credits the consumer's account, and handles subsequent disposition of the item.

31 Claims, 1 Drawing Sheet

U.S. PATENT DOCUMENTS

| | | | | |
|---|---|---|---|---|
| 6,002,767 | A | 12/1999 | Kramer | 380/24 |
| 6,003,024 | A | 12/1999 | Bair et al. | 707/3 |
| 6,006,225 | A | 12/1999 | Bowman et al. | 707/5 |
| 6,015,167 | A | 1/2000 | Savino et al. | 283/67 |
| 6,016,480 | A * | 1/2000 | Houvener et al. | 705/21 |
| 6,016,484 | A | 1/2000 | Williams et al. | 705/39 |
| 6,018,719 | A | 1/2000 | Rogers et al. | 705/24 |
| 6,029,150 | A | 2/2000 | Kravitz | 705/39 |
| 6,085,172 | A * | 7/2000 | Junger | 705/28 |
| 6,188,994 | B1 | 2/2001 | Egendorf | 705/40 |
| 6,192,347 | B1 | 2/2001 | Graff | 705/36 |
| 6,246,997 | B1 | 6/2001 | Cybul et al. | 705/27 |
| 6,269,344 | B1 * | 7/2001 | Junger | 705/28 |
| 6,321,211 | B1 | 11/2001 | Dodd | 705/26 |
| 6,327,576 | B1 | 12/2001 | Ogasawara | 705/22 |
| 6,453,352 | B1 | 9/2002 | Wagner et al. | 709/229 |
| 6,497,408 | B1 | 12/2002 | Walker et al. | 273/138.1 |
| 6,526,393 | B1 | 2/2003 | Fredman | 705/408 |
| 6,536,659 | B1 * | 3/2003 | Hauser et al. | 235/375 |
| 6,547,136 | B1 | 4/2003 | Sansone | 235/385 |
| 6,616,189 | B2 | 9/2003 | Raming | 283/81 |
| 6,754,637 | B1 * | 6/2004 | Stenz | 705/26 |
| 6,757,663 | B1 | 6/2004 | Rogers et al. | 705/24 |
| 6,834,268 | B2 | 12/2004 | Junger | 705/28 |
| 6,865,560 | B1 | 3/2005 | Sansone et al. | 705/404 |
| 6,974,928 | B2 | 12/2005 | Bloom | 209/583 |
| 6,980,962 | B1 | 12/2005 | Arganbright et al. | 705/26 |
| 7,062,473 | B1 | 6/2006 | Taylor | 705/402 |
| 7,197,475 | B1 | 3/2007 | Lorenzen et al. | 705/26 |
| 2001/0011231 | A1 | 8/2001 | Junger | |
| 2001/0032141 | A1* | 10/2001 | Drattell | 705/26 |
| 2001/0032143 | A1 | 10/2001 | Haseltine | |
| 2001/0032147 | A1 | 10/2001 | Siegel | 705/26 |
| 2001/0037207 | A1 | 11/2001 | Dejaeger | 705/1 |
| 2001/0037247 | A1 | 11/2001 | Haseltine | |
| 2001/0047315 | A1 | 11/2001 | Siegel | 705/28 |
| 2002/0010634 | A1 | 1/2002 | Roman et al. | 705/26 |
| 2002/0010689 | A1 | 1/2002 | Tibbs et al. | 705/408 |
| 2002/0019777 | A1* | 2/2002 | Schwab et al. | 705/26 |
| 2002/0019785 | A1 | 2/2002 | Whitman | 705/28 |
| 2002/0032573 | A1 | 3/2002 | Williams et al. | 705/1 |
| 2002/0032612 | A1 | 3/2002 | Williams et al. | 705/26 |
| 2002/0077976 | A1 | 6/2002 | Meyer et al. | |
| 2002/0082920 | A1 | 6/2002 | Austin et al. | |
| 2002/0083007 | A1 | 6/2002 | Sutherland et al. | |
| 2002/0095306 | A1 | 7/2002 | Smith et al. | 705/1 |
| 2002/0128915 | A1* | 9/2002 | Haseltine | 705/26 |
| 2002/0133425 | A1 | 9/2002 | Pederson et al. | 705/26 |
| 2002/0138356 | A1 | 9/2002 | Dutta et al. | 705/26 |
| 2002/0152093 | A1 | 10/2002 | Chalmers et al. | 705/1 |
| 2002/0178076 | A1 | 11/2002 | Ross | 705/26 |
| 2003/0023496 | A1 | 1/2003 | De Mol Van Otterloo et al. | 705/22 |
| 2003/0061104 | A1 | 3/2003 | Thomson et al. | 705/26 |
| 2003/0105704 | A1 | 6/2003 | Sundel | 705/37 |
| 2003/0160097 | A1 | 8/2003 | Steiner | 235/385 |
| 2004/0073435 | A1 | 4/2004 | Rosenbaum | 705/1 |
| 2004/0083179 | A1 | 4/2004 | Sesek et al. | 705/53 |
| 2004/0128265 | A1 | 7/2004 | Holtz et al. | 705/406 |
| 2004/0172260 | A1 | 9/2004 | Junger et al. | 705/1 |
| 2005/0038758 | A1 | 2/2005 | Hilbush et al. | 705/402 |
| 2005/0203809 | A1 | 9/2005 | Stone et al. | 705/27 |

OTHER PUBLICATIONS

U.S. Patent Application entitled Method and System Providing Out-Sourced Merchandise Return Services, Serial No. unknown; Inventors, unknown.

UPS Autumn 2002 Forum, "The Far East is not so far," 12259 UPS Forum. ENG/SPEC 4 pages, Oct. 17, 2002.

U.S. Appl. No. 10/659,465 entitled "Method and System Using Return Labels with Dynamically Generated Multiple Datapoint Coding", filed by Edward J. Stashluk Jr. et al. Sep. 10, 2003.

Machlis, "E-commerce = E-returns," Computerworld, v31, n51, Abstract, 1 page, Dec. 22, 1997.

U.S. Postal Rate Commission, "Opinion and Recommended Decision Approving Revised Stipulation and Agreement," Docket No. MC99-1, 35 pages, May 14, 1998.

Goldblatt, "Stores, Online Retailers Prepare for Returns," Knight-Ridder Tribune Business News, 1 page, Dec. 29, 1999.

Petersen, "Online Purchases: Easy to get, hard to return," PC Week, 30, 2 pages, Feb. 14, 2000.

"Cattron acquires Theimeg," Modern Materials Handling, Boston, vol. 55, Iss. 11, 2 pages, Oct. 2000.

"J. Crew Selects Newgistics' ReturnValet Service for Managing Product," Business Wire, 3 pages, Jan. 14, 2002.

"Carrier Route Definitions," CarrierRoutes.com, 6 pages, 2006.

USPTO Office Action for U.S. Appl. No. 10/750,935, inventor Philip S. Siegel, 9 pages, May 1, 2008.

USPTO Office Action for U.S. Appl. No. 10/745,096, inventor Terry Combs, 10 pages, May 5, 2008.

USPTO Office Action for U.S. Appl. No. 10/775,368, inventor Edward J. Stashluk, 16 pages, Jun. 12, 2008

USPTO Office Action for U.S. Appl. No. 10/745,096, inventor Terry Combs, 10 pages, Nov. 14, 2008

USPTO Office Action for U.S. Appl. No. 09/817,353, inventor Philip S. Siegel, 11 pages, Nov. 19, 2008

USPTO Office Action for U.S. Appl. No. 10/775,368, inventor Edward J. Stashluk Jr., 18 pages, Dec. 24, 2008

USPTO Office Action for U.S. Appl. No. 11/042,378, inventor Edward J. Stashluk Jr., 38 pages, Feb. 12, 2009

USPTO Office Action for U.S. Appl. No. 10/659,465, inventor Edward J. Stashluk Jr., 14 pages, Apr. 3, 2009

USPTO Office Action for U.S. Appl. No. 10/775,368, inventor Edward J. Stashluk Jr., 15 pages, Aug. 19, 2009.

USPTO Office Action for U.S. Appl. No. 10/659,465, inventor Edward J. Stashluk Jr., 15 pages, Aug. 20, 2009.

USPTO Office Action for U.S. Appl. No. 10/745,096, inventor Terry Combs, 18 pages, Aug. 24, 2009.

USPTO Office Action for U.S. Appl. No. 11/042,378, filed Jan. 25, 2005, inventor Edward J. Stashluk, Jr., 43 pages, Sep. 16, 2009.

* cited by examiner

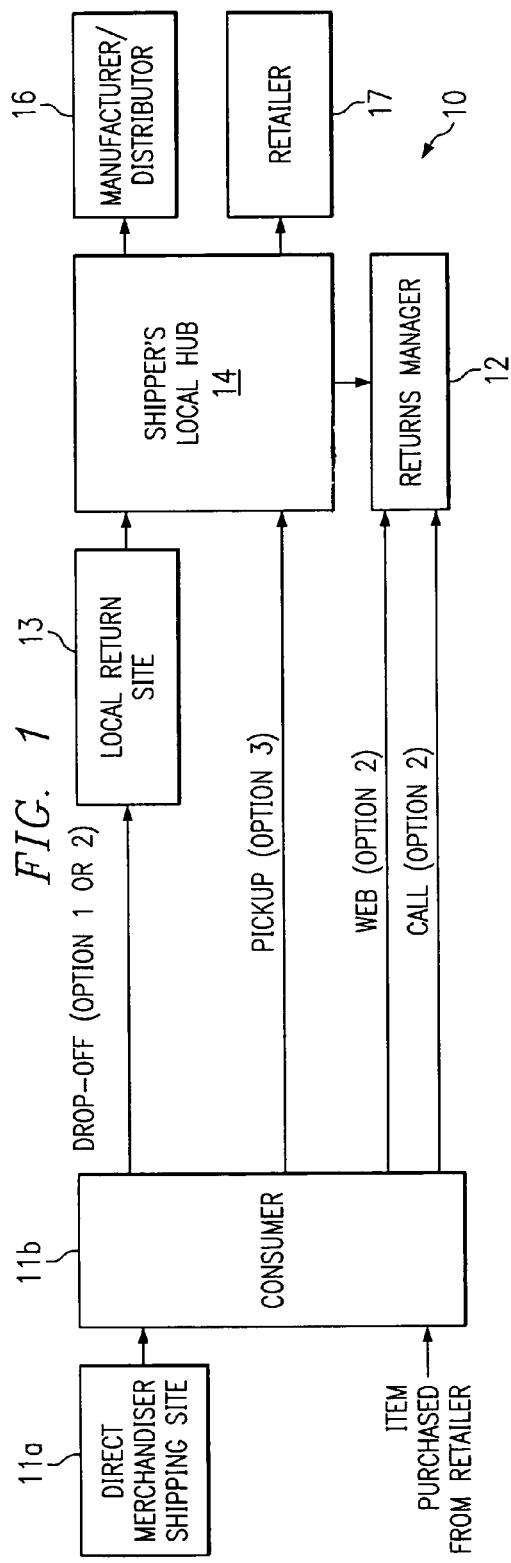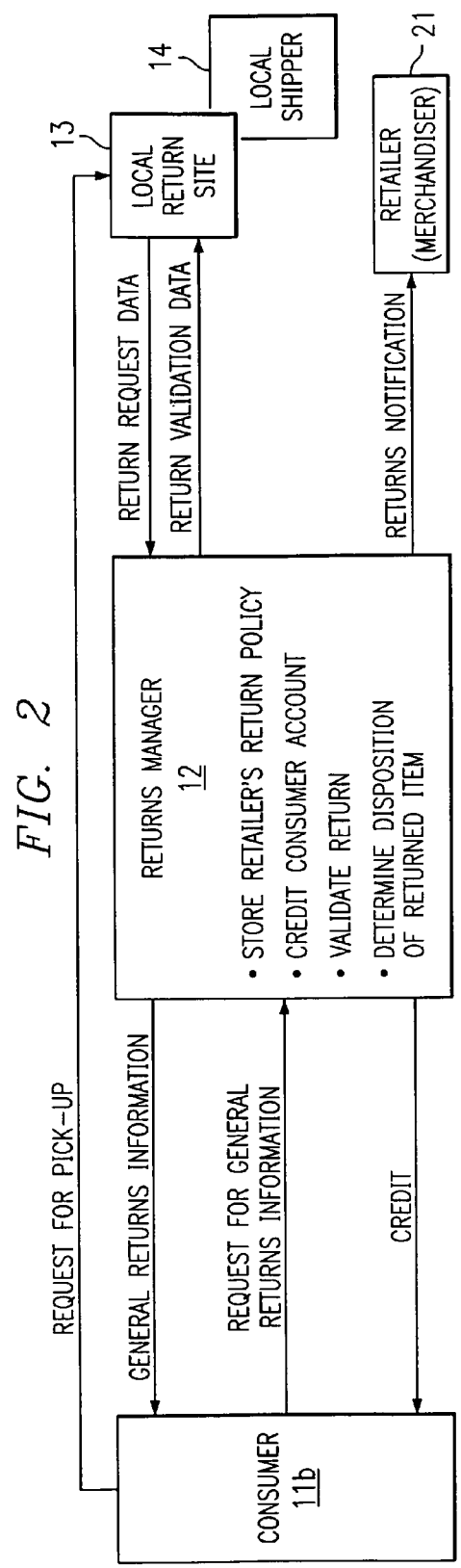

US 7,716,091 B2

LOCAL RETURNS OF REMOTELY PURCHASED MERCHANDISE WITH RETURN CODE VALIDATION

TECHNICAL FIELD OF THE INVENTION

This invention relates to electronic commerce, and more particularly to a method of managing local returns of goods purchased via the Internet in a manner that reduces consumer fraud.

BACKGROUND OF THE INVENTION

The growing popularity of electronic commerce over the Internet is a modern phenomena. Retail e-commerce is far more convenient than bricks and mortar shopping, but one of its drawbacks is that the customer lacks the ability to inspect the goods. Inherent in Internet purchases may be an increased likelihood of customer returns.

For returns not purchased in an e-commerce environment, a consumer can visit a brick and mortar retail store, which accepts product returns at the retail location. Typically, the store will operate a sales counter or customer service counter specifically for returns. Consumers could expect to immediately receive cash or a credit on the return.

In the conventional returns scenario, the retailer of a returned good will assess the condition of the returned item. Returned goods in new condition can be put back on the shelf for re-sale. Returned goods that were defective or otherwise inappropriate for resale can be collected and stored until enough goods accumulated to justify bulk shipment to some sort of disposition center. At the disposition center, the condition of returned goods are again evaluated and goods were routed to an appropriate destination, such as an outlet store, manufacturer, or land-fill.

This conventional method of handling returns goods is not necessarily the most satisfactory for Internet purchases. In the absence of local brick and mortar retail locations, the goods must be shipped from the consumer back to the internet retailer's location. From there, the costly process of shipping and handling of returned goods back through the retail channel continues.

Returns to catalog retailers have the same complications as returns of Internet purchases. Despite these inefficiencies, internet and catalog retailers (collectively known as direct marketers) are still using conventional product returns methods.

SUMMARY OF THE INVENTION

One aspect of the invention is a method of using a public communications network, such as the Internet, to manage the return of an item purchased by a consumer from a remote direct merchandiser. The consumer may or may not initiate a return by accessing a returns manager, such as by telephone or website. If the consumer initiates a return in this manner, he or she may receive general returns information or return authorization (including a unique return validation code).

In any event, it is assumed that in some manner or another, the consumer acquires a return validation code to present with the item being returned. For example, another method for providing the return validation code is to simply assign the code at the time of the sale and print it on the invoice.

To return an item, the consumer may simply take the item to a local returns center, who communicates return request data to the returns manager. In response, the returns manager provides return validation data to the local returns site. The validation data includes a return validation code, which is matched to the code provided by the consumer. After the return is validated, the returns manager initiates a credit to an account of the consumer for a return value of the returned item.

Typically, the above-described communications, with the consumer and with the local return site, will be performed via a website maintained by the returns manager. A similar returns process may occur where the consumer calls a local shipper for pick-up rather than takes the item to a local return site.

An advantage of the invention is that it provides an efficient "reverse logistics business process". The process eliminates unnecessary shipping and handling of returned products. Using the internet and a set of predetermined process rules, de-centralized handling of product returns can direct product returns to the least costly method of disposal.

The consumer is better satisfied by knowing that returns can be conveniently made. The local returns process permits the consumer to immediately receive monetary credit for a returned item. Also, the process is amenable to use of existing storefronts such as mail centers for local drop off. Thus, the consumers need not travel far to drop off returns. At the drop off centers, employees can be easily trained to effect a standardized returns process, thereby promoting a high level of consumer service.

BRIEF DESCRIPTION OF THE DRAWINGS

FIG. 1 illustrates a system for local returns of goods purchased from a remote direct merchandiser, and shows paths followed by returned items.

FIG. 2 illustrates data paths for returns messages and information exchanged within the system of FIG. 1.

DETAILED DESCRIPTION OF THE INVENTION

Local Returns of Remotely Purchased Goods

FIG. 1 illustrates a system for returns of goods purchased remotely from a direct merchandiser, such as an Internet retailer or catalog retailer. For purposes of this description, direct merchandisers are referred to simply as "retailers".

FIG. 1 is primarily directed to the various paths that may be followed by a returned item; communications paths for requests and information related to a return are described below in connection with FIG. 2. Additional details describing the system of FIG. 1 are set out in U.S. patent Ser. No. 09/796,337, entitled "Method and System for Processing the Local Return of Remotely Purchased Products", incorporated by reference herein.

In general, system 10 implements "reverse logistics product returns". It provides consumers with a convenient method to return unwanted products and receive a refund. System 10 provides retailers with an efficient and cost effective returns process that reduces the risk of fraudulent returns.

For purposes of FIG. 1, it is assumed that a consumer 11 is assumed to have ordered an item via the Internet or by telephone, and to have received the item via some sort of delivery service. It is further assumed that the retailer from whom the item was purchased is a member of system 10. This membership may be made known to the customer in any number of ways, such as by notification on the consumer's invoice. In general, the retailer becomes a member of system 10 by agreeing with returns manager 12 that returns manager 12 will assist in the returns process in the manner described herein.

If the item is to be returned, consumer 11 determines an address (URL) for accessing a returns site 11 via the Internet. Consumer 10 uses the returns site 11 to gather general information about the retailer's returns policies and procedures, and to begin the returns process. Alternatively, consumer 10 may call the returns site 11 by telephone to receive general return information.

As indicated in FIG. 1, the consumer 11 may use either of two paths for returning the item. As explained below, from the consumer's point of view, the consumer 11 is concerned only with taking the item to a local return site 13 or in having the item picked up by a shipping service. In other words, there is no need for the consumer 11 to locate and ship to the remote retailer.

Thus, a first alternative is for the consumer 11 to request pick up at the consumer's home or other location. After the consumer 11 provides appropriate information online or via the telephone, a shipper is notified to pick up the item to be returned. This shipper role could be easily fulfilled by any one of the commercial shipping companies in wide use, such as Federal Express or UPS. The consumer gives the product to the driver from the shipper, who verifies the item being returned. The shipping company driver uses a wireless data terminal to log the receipt of the item being returned and to print a shipping label. The wireless data terminal communicates with returns manager 12 to process the transaction. The returns manager 12 may initiate an instant credit for the return to the consumer's account, such as by communicating with a credit card company or other financial administrator. The shipper delivers the product to the shipper's local hub 14, where it is held until the disposition of the product is determined.

A second alternative is for the consumer 11 to directly deliver the item to a local returns site 13. This "drop off" method, may be made with or without prior authorization that the consumer has obtained online or by telephone. For authorization, consumer 10 accesses returns manager 12 online or by telephone and provides the necessary information about the return. The consumer then chooses a nearby local returns site 13 and delivers the item to that location. Examples of suitable local returns sites 13 are neighborhood mailing and packaging centers, who have elected to participate in system 10.

At the local returns site 13, an employee accesses the returns manager 12 to input and send returns request data associated with the desired return. This data represents the necessary return information, using information provided by the consumer. The data permits the employee to access information describing a step-by-step process provided by the returns manager 12, which is specific to the product that is being returned and to the retailer that sold the product. This process includes verification of data provided by the consumer against data provided by the retailer, and permits the return to be validated at the local returns site 13.

At the local returns site 13, and after the product return has met the return guidelines, a shipper is notified to pick up the item from the returns site 13. This notification may come from the local returns site 13 or from returns manager 12. The consumer receives an immediate credit back to his or her credit card, or alternatively, some sort of voucher or receipt representing a credit. The retailer is notified of the return so that proper accounting measures can be taken. The product is delivered to the shipper's local hub 14 where it is held until the disposition of the product is determined. Alternatively, the item may be returned to the retailer.

Once a returned item reaches the shipper's local hub 14, various dispositions of the item are possible. The returns manager 12 notifies the retailer that a product return is in progress, via an integrated internet backend process, and the account number of the consumer and the order number are identified. The best disposition of the product is chosen based on pre-determined rules (selected by the retailer) that eliminate unnecessary shipping and handling, based on the state or condition of the returned product.

If desired by the retailer, the item may be sent to the returns manager 12. Once the product is in the possession of returns manager 12, it is processed for disposition. If it is selected for liquidation, it is automatically listed on an internet auction website, where it is liquidated via online auction. The retailer may choose to receive a fixed sum for the product, or to share the risk of liquidation by receiving some portion of the liquidation revenue.

The retailer may also choose some other disposition method. For example, the retailer may choose to re-sell the product at a retail price, in which case the product could be shipped directly to the new buyer. Or, the retailer may choose to ship the product to the manufacturer 16 because of some defect; or to a charity to whom the product is to be donated.

As indicated above, regardless of whether the consumer 11 drops off the item or has it picked up, the local return of direct-marketed goods allows the consumer to receive immediate credit for the returned product. Also, the rules-based disposition decision process allows for an immediate, automatic disposition decision, prior to returning the product to the retailer via an expensive shipping and handling process. Finally, by using online auction websites, returns manager 12 can dispose of returned goods one item at a time. The retailer thus avoids costly warehousing of returned goods and the labor costs associated with processing them, and captures the best possible financial return on returned goods by making them available to a large number of interested buyers at online auction websites. This avoids costly aggregation of products in warehouses in order to liquidate them in bulk via conventional liquidation agents. This also accelerates the liquidation process, clearing the retailer's accounting and logistics systems faster and disposing of goods while they are still fresh, reducing the risk of their becoming outdated by newer versions.

Public Network Messaging and Data Management by Returns Manager

FIG. 2 illustrates how returns manager 12 makes use of the public communications networks to receive and deliver various data to and from the various entities involved in the returns process. The Internet is but one example of a public data communications network on which this type of communications may occur. The same type of communications are possible over a public telephone network. Thus, "access" to returns manager 12 may be either via the Internet or via telephone.

As explained above in connection with FIG. 1, returns manager 12 may or may not be initially accessed by the consumer 11 for general returns information. Typically, returns manager 12 maintains a returns website that may be accessed by the consumer for this general information. The website may be accessed directly by entering the Internet address of the returns manager or by activating a link on the merchandiser's website.

After consumer 11 has delivered the item to a local returns site 13 or has had the item picked up by a local shipper 14, either of these entities accesses returns manager 12. As explained above, the access by the local shipper 14 may be performed by a route driver who relates directly with the consumer 11. The local returns site 13 or shipper 14 communicates return request data to the returns manager 12, specific to the item. In response, the returns manager 12 provides returns validation data, which may be used by the local site 13 or shipper 14 to validate the return. A method of providing a returns validation code is described below as one approach to validation.

Once the return is validated, returns manager 12 initiates a credit to the consumer's account. This credit can be initiated by notification to an agent of the consumer 11, such as a credit card company. Returns manager 12 then provides notification of the transaction to the retailer 21.

Returns manager 12 also stores or otherwise accesses returns policy data particular to the retailer of the returned item. Returns manager 12 uses this returns policy data to determine disposition of the returned item. As explained above, the item might be held for sale at auction or shipped elsewhere for disposition.

Invoice Validation for Returned Goods

As explained above, from the retailer's point of view, one approach to handling returns is to maintain, or contract with, local storefronts that will accept returns. The local storefront will inspect the goods, verify information, and generate a credit to the customer.

An example of a local storefront that handles returns is the local drop off site 13 described above in connection with FIG. 1. Also, in the system of FIG. 1, when the consumer opts for the pick-up option, verification could alternatively be performed by the shipper.

A problem with local (decentralized) returns is that a local storefront does not always have access to the retailer's order data. As a result, when a credit is generated, the storefront may have no more information other than what is presented by the consumer. For example, the local storefront might see only what appears on a sales invoice originally sent with the goods and presented by the consumer. It is easily possible for the consumer to fraudulently modify the invoice. For example, the consumer might alter the price of the goods to be greater than that actually paid. Or, the consumer might alter the invoice's written description of the goods so that the returned item appears to be a returnable, when in fact it is not.

To solve this type of problem, a return validation code is associated with each returnable good. This validation code is algorithmically generated and contains a field for each of the following items of information:

an identifier unique to the retailer who sold the item;
a return authorization number;
the purchase date of the good;
the seller's product ID for the good; and
a purchase price.

Any one of various algorithms may be used to generate the code. In general, the algorithm accepts the above parameters and generates a number that cannot be decoded to its original elements.

The return validation code may be assigned to the item at any one of various time points during the sale/return process. For example, before returning an item, the consumer 11 could be required to obtain a return authorization that includes the return validation code. This return authorization could be obtained from the returns manager 12 via telephone or online access. Alternatively, the consumer 11 might obtain the return authorization from the retailer 21, by telephone or online access. Or, the return code could be generated at the time of the sale and provided with the original sales invoice.

When the consumer 11 takes the item to the local drop off site 13, or when the item is picked up by a shipper, the consumer's return validation code is attempted to be matched to a code provided by returns manager 12. This matching can be performed manually by the local returns site 13 or local shipper 14. Or, either of these entities could provide the consumer's code to returns manager 12, such as by entering it to a website operated by returns manager 12, and the matching could be performed automatically. If any of the invoice information has been modified, the code match will fail, thereby invalidating the return.

Other Embodiments

Although the present invention has been described in detail, it should be understood that various changes, substitutions, and alterations can be made hereto without departing from the spirit and scope of the invention as defined by the appended claims.

What is claimed is:

1. A method of using a public communications network to manage the return of an item purchased by a consumer from a remote direct merchandiser, comprising the steps of:
   receiving a first communication at a returns manager system, the first communication comprising return request data from a local returns site;
   providing a second communication from the returns manager system to the local returns site, the second communication comprising return validation data having at least a return validation code;
   validating the return by matching the return validation code with a pre-authorization code provided by the consumer to the local returns site, the pre-authorization code obtained by the consumer and indicating prior approval of the return by a remote direct merchandiser from whom the item was purchased; and
   crediting an account of the consumer for a return value of the returned item after validating the return;
   wherein the first and second communications are communicated using a public communications network.

2. The method of claim 1, wherein the public communications network is the Internet.

3. The method of claim 1, wherein the public communications network is the public telephone network.

4. The method of claim 1, wherein the public communications network is a combination of Internet access and public telephone access.

5. The method of claim 1, further comprising:
   receiving a third communication at the returns manager system, the third communication comprising a request for general returns information from the consumer; and
   providing a fourth communication from the returns manager system to the consumer, the fourth communication comprising data representing general returns information.

6. The method of claim 5, wherein the third and fourth communications are communicated using a website.

7. The method of claim 1, further comprising the step of accessing return policy data representing disposal of the item as desired by the direct merchandiser.

8. The method of claim 1, further comprising the step of providing the pre-authorization code to the consumer prior to the step of receiving return request data from the local returns site.

9. The method of claim 8, wherein the step of providing a return validation code to the consumer is performed using a website accessed by the consumer.

10. The method of claim 1, wherein the steps of receiving return request data and of providing return validation data are performed using a website.

11. A method of using a public communications network to manage the return of an item purchased by a consumer from a remote direct merchandiser, comprising the steps of:

receiving a first communication at a returns manager system, the first communication comprising return request data from a local shipper;

providing a second communication from the returns manager system to the local shipper, the second communication comprising return validation data having at least a return validation code;

validating the return by matching the return validation code with a pre-authorization code provided by the consumer to the local returns site, the pre-authorization code obtained by the consumer and indicating prior approval of the return by a remote direct merchandiser from whom the item was purchased; and crediting an account of the consumer for a return value of the returned item after validating the return;

wherein the first and second communications are communicated using a public communications network.

12. The method of claim 11, wherein the public communications network is the Internet.

13. The method of claim 11, wherein the public communications network is the public telephone network.

14. The method of claim 11, wherein the public communications network is a combination of Internet access and public telephone access.

15. The method of claim 11, further comprising:

receiving a third communication at the returns manager system, the third communication comprising a request for general returns information from the consumer; and providing a fourth communication from the returns manager system to the consumer, the fourth communication comprising data representing general returns information.

16. The method of claim 15, wherein the third and fourth communications are communicated using a website.

17. The method of claim 11, further comprising the step of accessing return policy data representing disposal of the item as desired by the direct merchandiser.

18. The method of claim 11, further comprising the step of providing the pre-authorization code to the consumer prior to the step of receiving return request data from the local shipper.

19. The method of claim 18, wherein the step of providing a return validation code to the consumer is performed using a website accessed by the consumer.

20. The method of claim 11, wherein the steps of receiving return request data and of providing return validation data are performed using a website.

21. A system for managing a return of merchandise, comprising:

a retailer comprising a remote direct merchandiser from which one or more items may be purchased by a consumer;

a returns manager system communicatively coupled to the retailer over a public communications network, the returns manager system operable to:

receive a first communication identifying at least an item of merchandise to be returned by the consumer in the future;

identify the retailer as the remote direct merchandiser from which the at least one returned item was purchased by the consumer; and send a second communication to the retailer identifying the item of merchandise to be returned by the consumer to provide the retailer with advance notification of the return.

22. The system of claim 21, wherein the retailer is operable to:

receive the notification of the return of the item; and update an accounting to reflect the status of the item as return pending.

23. The system of claim 21, wherein the first communication is received from a local returns site communicatively coupled to the returns manager system.

24. The system of claim 23, wherein the local returns site is operable to receive the returned item from the consumer.

25. The system of claim 23, wherein the local returns site is operable to receive the returned item from a shipper.

26. The system of claim 23, wherein the local returns site is operable to process the returned item.

27. The system of claim 23, wherein the returns manager system is further operable to:

receive a third communication from the local returns site, the third communication comprising return validation data;

transmit a fourth communication to the local returns site, the fourth communication comprising return validation data having at least a return validation code.

28. The system of claim 27, wherein the local returns site is further operable to:

validate the return by matching the return validation code with a pre-authorization code provided by the consumer; and credit an account of the consumer for a return value of the returned item after validating the return.

29. The system of claim 21, wherein the public communications network comprises an Internet, the first and second communications transmitted over the Internet.

30. The system of claim 21, wherein the public communications network comprises a telephone network, the first and second communications transmitted over the telephone network.

31. The system of claim 21, wherein the first communication identifies an order associated with the returned item.

* * * * *